INVENTORS
JOHN L. HARNED
KEITH M. MILLER
DONALD L. NORDEEN
JOHN ROBERTSON Jr.
BY Edward H. Goodrich.
THEIR ATTORNEY Oct. 11, 1966  J. L. HARNED ET AL  3,277,745
DRIVE TRANSFER MECHANISM
Filed Oct. 19, 1964  2 Sheets-Sheet 2

INVENTORS
JOHN L. HARNED
KEITH M. MILLER
DONALD L. NORDEEN
JOHN ROBERTSON Jr.
BY Edward H. Goodrich
THEIR ATTORNEY

United States Patent Office

3,277,745
Patented Oct. 11, 1966

3,277,745
DRIVE TRANSFER MECHANISM
John L. Harned, Grosse Pointe Woods, Keith M. Miller, Warren, Donald L. Nordeen, Orchard Lake, and John Robertson, Jr., Royal Oak, Mich., assignors to General Motors Corporation, Detroit, Mich., a corporation of Delaware
Filed Oct. 19, 1964, Ser. No. 404,726
4 Claims. (Cl. 74—691)

This invention relates to variable speed transmissions and particularly to a variable speed differential drive transfer mechanism.

This application is a continuation-in-part of our copending application, Serial No. 154,755, filed November 24, 1961.

Frequently, power equipment is required to provide an infinite number of speed ratios in both forward and reverse driving directions. One way of accomplishing this is by combining a differential drive with a variable speed friction drive wherein the friction drive may be used to change the speed at which parts of the differential are rotated thus providing a substantial number of speed ratios in both directions of drive. However, in this type of reversible drive, the forward and reverse speeds are not the same for corresponding settings of the friction drive. For example, if the friction drive in such a construction is of the toric drive type, an equal tilt of the rollers in opposite directions will not produce equal forward and reverse output speeds. Consequently, a graphical illustration of output speed as a function of roller tilt angle would result in a non-symmetrical as well as a non-linear curve. With such a construction, during a reverse operation, the rollers would have a different range of movement than during forward operation, and this would result in uneven wear of the torus races.

Another problem with a combined differential and toric drive is that the reaction torque is not directly related to the load torque. Hence, any axial loading mechanism that operates based on the extent of load cannot give the proper loading for all conditions of operation. Accordingly, this invention contemplates a novel drive transfer mechanism that affords an infinite number of speed ratios which are gradually adjustable both in a forward and reverse direction. In this invention, the output speeds from the mechanism vary substantially linearly with changes in control settings both in forward and in reverse directions, and a graph of output speed vs. control settings has a symmetrical curve.

Another feature of this invention resides in the provision of a drive transfer mechanism of a character that employs a friction device for adjustably controlling speed ratios in a drive system such that the reaction torque on the friction device is directly related to load torque.

More specifically, the drive transfer mechanism of the present invention utilizes a toric drive controlling device between input and output differentials in a unique manner which causes the reaction torque on the toric drive device to be directly proportional to the load torque, thus rendering an axial loading mechanism for the toric drive which always provides optimum axial forces on the toric drive.

To these ends and also to improve generally upon devices of this character, this invention consists in the various matters hereinafter described and claimed. In its broader aspects, the invention is not necessarily limited to the specific structures selected for illustrative purposes in the accompanying drawings wherein:

Figure 1:
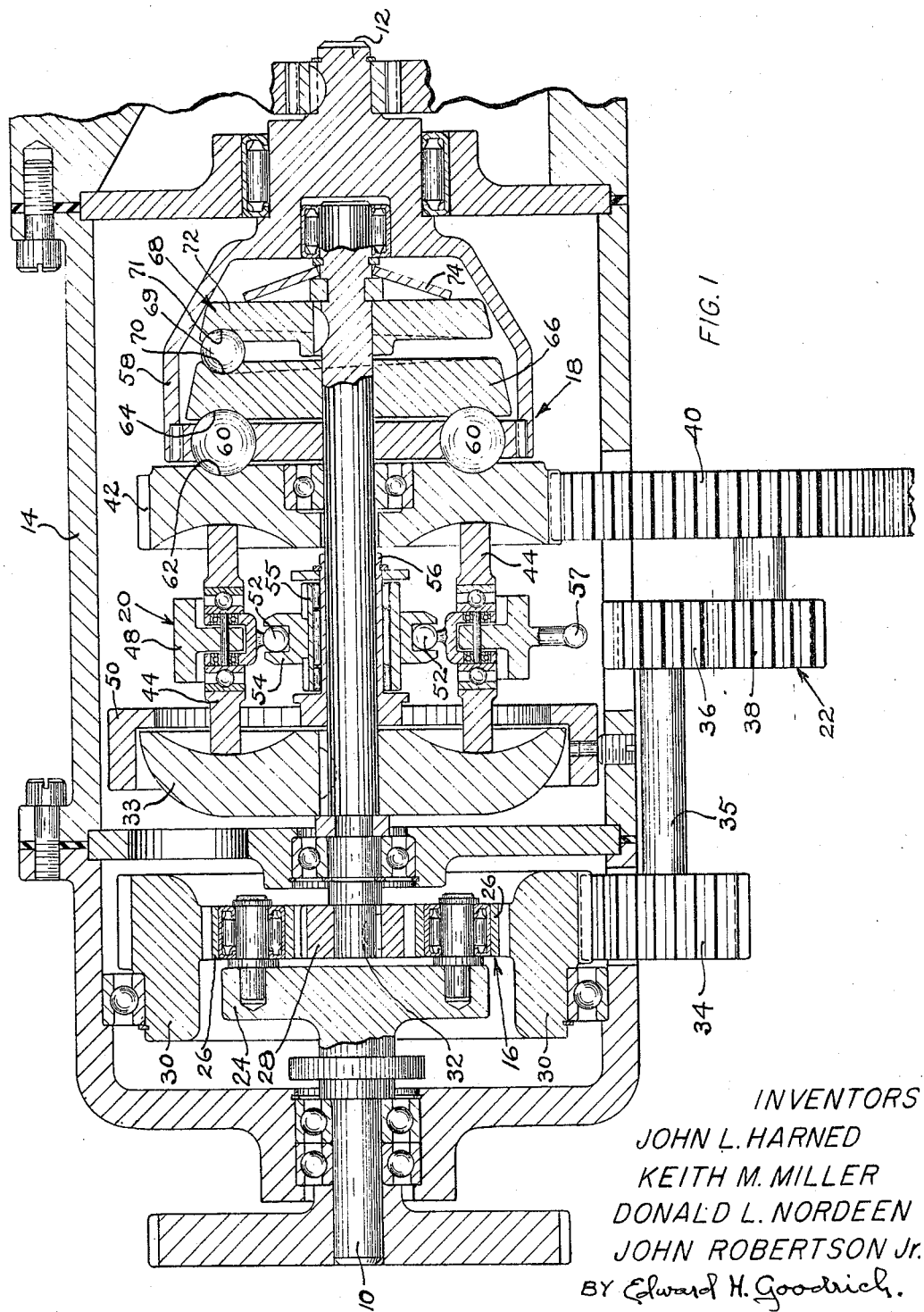
FIGURE 1 is a sectional and diagrammatic view of a drive transfer mechanism incorporating the principles of the invention.

Referring now to the drawings in detail and particularly to FIGURE 1, the drive mechanism embodies an input shaft 10 and an output shaft 12 both of which are journalled within a casing 14 to transfer drive between a power source and a load through an arrangement to be described. This arrangement provides for a rotation of the output shaft either in an infinite number of ratios both in forward and reverse directions or to be maintained stationary while sustaining a load.

The arrangement for accomplishing the foregoing includes a drive dividing differential 16, a drive combining differential 18, friction drive controlling device 20, and a reverser 22. Many different types of differentials may be employed for this arrangement. However, in the present illustration, the drive dividing differential 16 employs planetary gearing, whereas the drive combining differential 18 is shown as a preloaded ball bearing drive. It should be noted that by definition a differential is a gear train having one input and two outputs wherein the driving force or torque on the input is divided between the output or comprises the reverse of this arrangement. The speed ratio is expressed as a ratio of the input to the output when both outputs are operating at the same speed. The friction device 20 may be of various construction but is preferably of the toric type; for example, such as that shown in the Murden patent 2,132,751.

The drive dividing differential 16 utilizes a planetary gear arrangement having a planet carrier 24 which is driven by the input shaft 10. One or more planet pinions 26 are journalled on the carrier 24 and each of these pinions 26 intermeshes with a sun gear 28 and with a ring gear 30. The sun gear 28 is drivingly fastened as by a key to an intermediate shaft 32.

From the drive dividing differential 16, the torque is transferred tot he drive-combining differential 18 by two power paths, one of which is from the sun gear 28 to the drive combining differential 18 through the intermediate shaft 32 to a torus disc 33 and from this torus disc by way of the shaft 32 to an annular member 66 as will be later described. The other path is from the ring gear 30 to a countershaft gear 34 suitably supported on a counter shaft 35 journalled on the casing 14. The drive from the countershaft 35 extends through the reverser 22 which preferably comprises the two meshing gears 36 and 38 having the same number of teeth and serving to reverse the drive from the countershaft 35. This reversed drive is then carried through a gear 40 to a torus disc 42 at unity ratio where the sun gear and gear 34 provide a balanced torque thus forming a differential. However, when another ratio is employed as in combination with other gearing, this provides a differential drive which is connected by the torus disc 42 to drive one input of the drive combining differential 18.

The toric device 20 is connected across these two power paths in parallel relation with both of the differentials 16 and 18. This is accomplished by having the torus disc 33 keyed or otherwise secured to the intermediate shaft 32. Torque is transferred from the torus disc 33 through one or more circumferentially spaced rollers 44 to the torus disc 42. Each of these rollers 44 is journalled on a carrier 48 which is revolvably supported on a nonrotatable spider 50 that transmits reaction to the housing 14 for the purposes hereinafter explained. Each roller carrier 48 has a ball connection 52 with a ring 54 that is axially shiftable on a sleeve 55 journalled on a hub portion 56 on the spider 50. In view of the fact that the toric drive device 20 is similar in structure to that described in the above mentioned Murden Patent 2,132,751, additional description need not be made here. In accordance with the illustrations and description in this Murden patent, the control of the adjustable angular tilt of the roller axes with respect to a radial plane through the shaft 32 provides for an infinitely variable drive ratio between the torus discs 33 and 42. This variable toric drive serves as a static reaction unit which adjusts the relative rotational rate of the torus disc 42 and an annular member 66 driven by the shaft 32 as explained hereafter.

Figure 2:
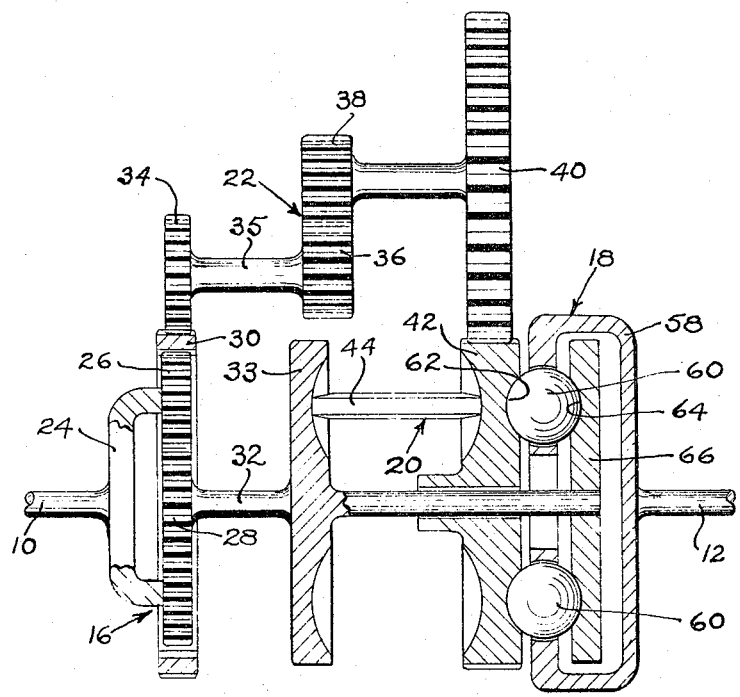
FIGURE 2 is a schematic diagram of the mechanism.

The control of the corresponding tilt positions of the rollers 44 may be accomplished in a suitable manner so that the angular shift of the rollers from the illustrated 1:1 ratio position depicted in FIGURES 1 and 2 will change the speed ratio between the two torus discs 33 and 42. This may be accomplished through a control lever 57 associated with one of the roller carriers 48 to regulate the angular position of these rollers as explained in the Murden Patent 2,132,751. Another method for roller positioning is to employ electrically operated servos (not shown) for individually maneuvering the rollers 44 about their inclination axes to precess each roller about its tilt axis to the different position. This latter method is disclosed in the copending application U.S. S.N. 138,106, filed September 14, 1961, now Patent No. 3,222,944.

The drive combining differential 18 includes a ball carrier 58 that positions a series of circumferentially spaced balls 60 and which is drive-connected to the output shaft 12. The balls 60 engage opposed input races 62 and 64 respectively formed on the torus disc 42 and on an annular member 66. Although the race 62 forms a part of the torus disc 42, this race could comprise a separate part secured to this torus disc. The drive-combining differential 18 operates in a well known manner such that if the races 62 and 64 are rotating at the same speed but in opposite directions, no drive will be transferred by the balls 60 to the carrier 58 and thence to the output shaft 12. However, if the races 62 and 64 are rotating at different speeds, the ball carrier 58 will be driven at a speed determined by the differential speed of races 62 and 64 either in a forward or reverse direction dependent on which race is rotated at the faster rate in one direction. This ball differential eliminates backlash and therefore provides a significant advantage over gear-type differentials.

The loading of the ball differential 18 as well as the loading of the toric drive mechanism 20 is accomplished by an axial loading mechanism 68 arranged back of the ball differential 18. This axial loading mechanism 68 embodies a ball ramp construction wherein balls 69 engage under load in opposing arcuate cam grooves 70 and 71 respectively formed in the annular member 66 and in a loading member 72. These grooves 70 and 71 gradually vary in depth as illustrated. An energizing force from a spring 74 which is compressed against the loading member 72 that is slidably keyed to the intermediate shaft 32, produces a wedging action between the balls 69 and the cam grooves 70 and 71 thus generating an axial force which increases proportionally to the torque load on the output shaft 12. This axial force prevents slippage between the rollers 44 and the torus discs 33 and 42 and thereby facilitates the assumption of increased torques. Also, this wedging action of the balls 69 in the cam grooves 70 and 71 transmits rotation from the driven loading member 72 to the annular member 66.

The operation and advantages of this drive transfer mechanism will be appreciated by reference to the schematic diagram of FIGURE 2. It will be appreciated as previously explained that drive from the input shaft 10 is separated by the planetary differential 16 and transferred by the sun and ring gears 28 and 30 respectively to the annular members 66 and to the torus disc 42 which provide the two inputs for the ball differential 18. The reverser 22 drives the torus disc 42 in the same direction as imparted by the rollers 44 to this disc 42 and in the opposite direction to that of the annular member 66. The two output drives embodied to the torus disc 42 and to the annular member 66 are combined in the drive-combining differential 18 and delivered to the output shaft 12. Consequently, the speed and direction with which the output shaft is driven may be varied by altering the tilt angle of the rollers 44, i.e. by angularly orienting the axes of these rollers 44 clockwise or counterclockwise from the FIGURES 1 and 2 positions as will be apparent from the following simple equations, which are basic to the operation of the mechanism and which more accurately define its functions. The relationship of the drive dividing differential as 16 by having a ratio of 1:1 is defined by the equation (1) $\quad 2W_i = W_1 + W_2$ This equation states that the sum of the speeds of both drive dividing differential outputs, one to the torus disc 33, $W_1$, and the other to the torus disc 42, $W_2$, is equal to twice the speed of the input shaft 10 or $2W_i$.

The equation defining the operation of the drive combining differential 18 which has a 1:1 ratio is (2) $\quad 2W_o = W_2 - W_1$ The Equation 2 states that the difference between the speeds of the drive combining differential inputs, one from the torus disc 33, $W_1$, and the other from the torus disc 42, $W_2$, is equal to twice the speed of the output shaft 12, $2W_o$.

The toric drive device 20 introduces the relationship or the following speed ratio:

(3) $\quad u = \dfrac{W_2}{W_1}$

This equation defines the toric drive speed ratio as the ratio of the speed of the torus disc 42 to the speed of the torus disc 33. In these equations $W_i$ is equivalent to the speed of the input shaft 10;
$W_o$ is the speed of the output shaft 12;
$W_1$ is the speed of the torus disc 33; and
$W_2$ corresponds to the speed of the torus disc 42.

In these above-noted conditions, each differential 16 and 18 is assumed to provide a 1:1 ratio like that of the differential 18. Substituting Equation 3 into Equations 1 and 2 results in the new equations (1a) $\quad 2W_i = W_1 + uW_1$
(2a) $\quad 2W_o = uW_1 - W_1$ These last two equations can be solved simultaneously to describe the relationship between the speed of the output shaft 12, the speed of the input shaft 10 and the speed ratio of the toric drive unit 20. This relationship is defined by the equation (4) $\quad W_o = W_i \left( \dfrac{u-1}{1+u} \right)$ If as shown in the drawing, the planetary drive dividing differential produces a 1:2 ratio and the drive combining differential as above produces a 1:1 ratio, then Equation 1 would become $$4W_i = W_1 + W_2$$

and Equation 4 would become $$W_o = 2W_i \left( \dfrac{u-1}{1+u} \right)$$

These equations show that the drive dividing differential 16 divides the input torque into two power paths, one including the shaft 32 to and from the torus disc 33, the other path being through the torus disc 42. Both drives are combined by the drive combining differential 18 connected to the output shaft 12. The toric drive 20 comprises an infinitely variable change speed device between those two power paths and controls the speed relationship between these power paths.

For examplary purposes only and without limitation, let it be considered that the input speed $W_i$ is 3,000 r.p.m.

Under this condition where the differential 16 has a 1:1 ratio, the sum of the speeds $W_1$ and $W_2$ from Equation 1 will always be equal to 6000 r.p.m. If the toric drive 20 is now changed so that the rollers are angularly oriented clockwise to a 3:1 ratio position $W_1$ and $W_2$ will respectively become 1500 and 4500 r.p.m. On the other hand, if the rollers 44 are angularly oriented counterclockwise to the same extent and to the corresponding 3:1 ratio, positions $W_1$ and $W_2$ will become 4500 and 1500 r.p.m., respectively.

To determine the speed of the output shaft 12, Equation 2 is utilized. This equation takes into consideration the reversal action of the reverser 22. Assuming that the rollers 44 have been angularly oriented clockwise so that the prior $W_1$ and $W_2$ values of 1500 and 4500 r.p.m. are attained, then the output shaft 12 will be driven at a speed of 1500 r.p.m. in the forward direction relative to the rotational direction of the input shaft 10. Likewise, if the angular orientation of the rollers 44 is in a counterclockwise direction and at the same previously mentioned values, these values inserted in Equation 2, will produce an output speed of 1500 r.p.m. as before but now in a reverse direction of rotation.

The Equation 2 takes into account both the forward and reverse extremes between which the output speeds from the differential 18 may vary. Additionally, it will be noted that when the rollers 44 are angularly oriented to their center positions as illustrated in FIGURES 1 and 2, both the torus discs 33 and 42 will be rotationally driven at 3000 r.p.m. Under this condition, where this value of 3000 r.p.m. is applicable to both $W_1$ and $W_2$ in the Equation 2, it will be appreciated that a zero output is achieved under load. In other words, the output shaft 12 will remain stationary but will still sustain the load.

Figure 3:
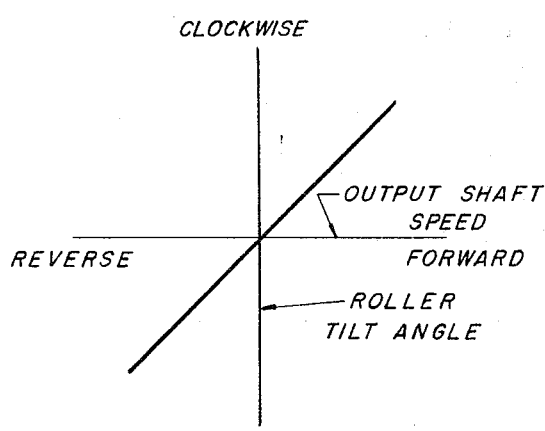
FIGURE 3 is a graph showing the relationship between the roller tilt angle and output shaft speed.

To more fully appreciate another of the valuable features of this drive transfer mechanism, reference is made to FIGURE 3 where it is shown graphically that with balanced differentials 16 and 18, the orientation of the rollers 44 to different tilt angles both in the clockwise and in counterclockwise directions and within the permissive range will result in a symmetrical approximately linear curve. In other words, for equal angular movements of the axes of these rollers 44 in either direction, equal speeds will always be produced in either a reverse or forward direction. For instance, in the prior examples just discussed, the output shaft 12 will either be rotating at a minus 1500 r.p.m. or a plus 1500 r.p.m. when in the opposite 3:1 ratio position.

It will be appreciated that in the event the mechanism illustrated in FIGURE 1 is not provided with balanced differentials, it will still operate satisfactorily but the linear curve of FIGURE 3 will not be symmetrical.

Figure 4:
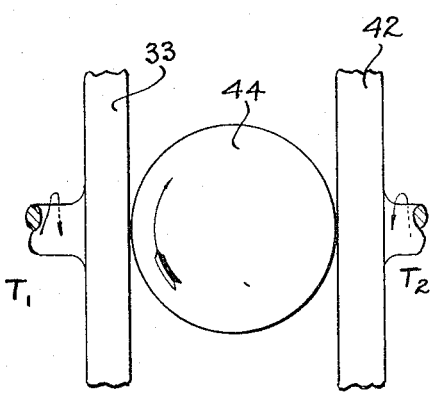
FIGURE 4 is a diagrammatic view of a toric drive for the mechanism.

Another important feature of this invention is illustrated by FIGURE 4 when considering the following torque equations:

(5) $\qquad T_L = T_1 + T_2$
(6) $\qquad R.T. = T_1 + T_2$ where:

$T_L$ is the load torque;
$T_1$ is the torque on the torus disc 33;
$T_2$ is the torque on the torus disc 42; and
R.T. is the reaction torque on the roller 44.

These equations show that the load torque on the output shaft 12 equals the sum of the two torques applied to the torus discs 33 and 42 from the two power paths. Also, the reaction torque is equal to the sum of these same two torques. Since the reaction torque and the load torque are always equal, and additionally, since the axial loading mechanism responds to the load torque, the axial loading mechanism 68 will not be influenced by the roller tilt angle. Hence, there will be adequate loading of the rollers under changing loads. If the reaction torque were not directly related to the load torque, the axial loading mechanism 68 would not always provide the best conditions of loading for different reaction torques, and consequently objectionable slippage could occur under some driving conditions.

From an inspection of the equation (7)
$$T_L = T_i\left(\frac{1+u}{1-u}\right)$$

in which $T_i$ indicates the input torque to the drive transfer mechanism, and the other legends have the previously explained designations, it will now be appreciated that at any speed load torque ($T_L$) is sustained by a proper input torque ($T_i$) and that with a zero output speed of the shaft 12 where $u=1$, a load torque ($T_L$) can be sustained by the input torque. This condition permits the output shaft to be maintained stationary under full load when desired, thus materially increasing the versatility of this drive transfer mechanism.

We claim:

1. A drive transfer mechanism comprising a rotatable input member, a rotatable output member, input and output differential drive trains respectively connected to said input and to said output members, means providing a pair of separate power drive mecahnisms connected in parallel between and sharing the driving load between the input and output members, means reversing the drive through one of said power drive mechanisms, a toric speed control device interposed between the power drive mechanisms, and means to adjustably change the rotational output of said toric speed control device to regulate the speed of the output member with respect to the rate of rotation of said input member.

2. In combination, a rotatable input member, a rotatable output member, an input drive separating differential connected to the input member, an output drive combining differential connected to said output member, a pair of power driving mecahnisms connected in parallel between and sharing the driving load between the input and output members, a reversing mechanism in one of the power driving mechanisms, and an adjustable toric speed control mechanism drivingly interposed between the pair of power driving mechanisms, said toric speed control being adjustable to regulate the speed ratio between the pair of power driving mechanisms whereby the rotation of the output member will be driven at variable speeds in forward and reverse directions without altering the rotational direction or speed of said input member.

3. In combination, a rotatable input member, a rotatable output member, input and output differential drive trains respectively drive-connected to the input and to the output members, the input drive train including a driven element drive-connected to the input member and drive-connected to a driving element, the output drive train including a pair of driven elements respectively drive-connected to said driving and driven elements in the input drive train thereby providing a pair of separate power paths between said drive trains, the output drive train including a driving element connected to said output member, a reversing mechanism in one of the power paths and a toric speed controller interposed between the power paths to vary the speed ratio between said paths and cause the output member to be driven at infinitely variable speeds in both forward and reverse directions of rotation.

4. In combination, a rotatable input member, a rotatable output member, input and output differential drive trains, said input train having an input planet carrier connected to the input member and having a planet pinion journalled thereon and having a plurality of output gears meshing with the planet pinion, the output differential drive train including a carrier drive connected to said output member and including a pair of driven races coacting with balls mounted within the last mentioned carrier, each driven race being connected to one of the input differential output gears thereby providing plural power paths between the input and output drive trains, a reversing mechanism drivingly interposed in one of the power paths, a toric speed changer including a pair of torus races and a roller drivingly interposed therebetween, one of said races being drive-connected in one of the power paths and the other race being drive-connected in said other power path, and means tiltably positioning the axis of said roller to vary the speed ratio between the power paths thus providing an infinitely variable speed of the driven output member in both forward and reverse direction of rotation.

References Cited by the Examiner

UNITED STATES PATENTS

| | | | |
|---|---|---|---|
| 1,056,292 | 3/1913 | Nettenstrom | 74—691 |
| 2,060,884 | 11/1936 | Madle | 74—796 |
| 2,229,338 | 1/1941 | Powers | 74—691 |
| 2,312,105 | 2/1943 | Liebrecht | 74—691 |
| 2,716,357 | 8/1955 | Rennerfelt | 74—691 |
| 3,024,476 | 9/1965 | Rouverol | 74—796 X |

DAVID J. WILLIAMOWSKY, *Primary Examiner.*

L. H. GERIN, *Assistant Examiner.*